United States Patent
Beaudeau et al.

(10) Patent No.: US 12,387,582 B2
(45) Date of Patent: Aug. 12, 2025

(54) METHOD FOR EXCHANGING INFORMATION ABOUT AN EVENT AND ASSOCIATED SYSTEM FOR EXCHANGING INFORMATION

(71) Applicant: IDEMIA IDENTITY & SECURITY FRANCE, Courbevoie (FR)

(72) Inventors: Jérôme Beaudeau, Courbevoie (FR);
Vincent Bouatou, Courbevoie (FR);
Mikaël Bougon, Courbevoie (FR);
Nicolas Renaud, Courbevoie (FR);
Olivier Touret, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 457 days.

(21) Appl. No.: 17/944,302

(22) Filed: Sep. 14, 2022

(65) Prior Publication Data
US 2023/0080675 A1    Mar. 16, 2023

(30) Foreign Application Priority Data
Sep. 16, 2021   (FR) .................................... 21 09731

(51) Int. Cl.
| | | |
|---|---|---|
| *G08B 21/02* | (2006.01) | |
| *G06V 10/764* | (2022.01) | |
| *G06V 10/94* | (2022.01) | |
| *G06V 20/52* | (2022.01) | |
| *H04L 67/52* | (2022.01) | |
| *H04N 7/18* | (2006.01) | |

(52) U.S. Cl.
CPC .......... *G08B 21/02* (2013.01); *G06V 10/764* (2022.01); *G06V 10/95* (2022.01); *G06V 20/52* (2022.01); *H04L 67/52* (2022.05); *H04N 7/183* (2013.01)

(58) Field of Classification Search
CPC ...... G08B 21/02; G06V 10/764; G06V 10/95; G06V 20/52; H04L 67/52; H04L 67/535; H04L 67/63; H04L 67/12; H04N 7/183; H04W 4/90
See application file for complete search history.

(56) References Cited

U.S. PATENT DOCUMENTS

| | | | | |
|---|---|---|---|---|
| 2016/0182707 | A1* | 6/2016 | Gabel | G06F 3/04883 455/404.2 |
| 2018/0202821 | A1* | 7/2018 | Yu | G01C 21/3423 |
| 2018/0314849 | A1* | 11/2018 | Maisonneuve | G06F 21/6209 |
| 2019/0193659 | A1* | 6/2019 | Miyazawa | G08G 1/0141 |
| 2020/0050611 | A1* | 2/2020 | Patton | G06F 16/254 |
| 2020/0394921 | A1* | 12/2020 | Lee | G01S 19/14 |
| 2021/0081477 | A1* | 3/2021 | Tibbet | G06F 16/2465 |

* cited by examiner

*Primary Examiner* — Christopher M Brandt
(74) *Attorney, Agent, or Firm* — Oblon, McClelland, Maier & Neustadt, L.L.P.

(57) ABSTRACT

A method for exchanging information about an event located in a zone, including a step of opening a two-way communication channel, triggered by a user located in the zone; a step of an electronic device acquiring zone data including images of the event and location data of the electronic device; a step of transmitting zone data to a server; a step of the server analysing the zone data; a step of the server generating user information on the basis of the analysis; a step of feeding back information, wherein the server transmits the user information to the electronic device, in order to send the user information to the user.

14 Claims, 2 Drawing Sheets

METHOD FOR EXCHANGING INFORMATION ABOUT AN EVENT AND ASSOCIATED SYSTEM FOR EXCHANGING INFORMATION

The invention relates to the field of securely exchanging information, in particular video images, about an incident or an accident.

Cooperative monitoring systems are known from the prior art in which a user can send or receive videos of a monitored zone to or from the monitoring system. The monitoring system notifies the user of an anomaly detected in the zone. The user can move around the zone and send images of the monitored zone to the security system.

When an individual witnesses an event in a zone such as an incident or accident, a dedicated and secure system is not provided for sending images of the event to a dedicated server with a view to receiving advice about any action to be taken and to notifying emergency services or law enforcement. Generally, the witness records a video of the event in the memory of their telephone and shares it on social media networks. The witness also notifies the emergency services or the police that an event is unfolding, but they are not always capable of providing the precise location of the event, nor of pertinently describing the facts relating to the event. Images posted on social media networks can cause panic, curiosity or malice from viewers of the video. The right to the image is not respected. Curious onlookers can move into the zone of the event, in order to witness the event first hand, which can place them in danger and hinder the intervention of emergency services or law enforcement. The witness has no feedback about the level of danger posed by the event nor the risk they are taking by remaining in the zone in order to film the event.

The aim of the invention is to address the aforementioned problems of the prior art by providing a method for securely exchanging information, initiated by the witness user, and in return providing the witness user with information about the event.

The invention relates to a method for exchanging information about an event located in a zone, in a system comprising a server and an electronic device suitable for use by a user comprising an image acquisition device, the method for exchanging information comprising the following steps:
- a step of opening a two-way communication channel between the electronic device and the server, triggered by a user of the electronic device, the user being located in the zone;
- a step of the electronic device acquiring zone data, the zone data comprising images of the event acquired by the acquisition device and location data of said electronic device;
- a transmission step, in which the electronic device transmits said zone data to the server;
- a step of the server analysing the zone data;
- a step of the server generating user information on the basis of said analysis;
- a step of feeding back information, in which the server transmits said user information to the electronic device, in order to send said user information to the user.

According to one aspect of the invention, the analysis step comprises a machine analysis by a computer of the server and a human analysis by a professional operator of the server.

According to one aspect of the invention, the user information is based on the location of said electronic device.

According to one aspect of the invention, the acquisition and transmission steps are subject to prior authorization by the user.

According to one aspect of the invention, the zone data further comprises user data selected by the user from among a plurality of predetermined event contexts.

According to one aspect of the invention, the plurality of predetermined event contexts is based on the analysis and/or a log of events about said zone.

According to one aspect of the invention, the step of opening a communication channel comprises a user action selected from among the electronic device reading a code displayed in said zone at the initiative of the user, the user activating a hyperlink sent by a communication system to the electronic device, or the user triggering the opening of an application installed on the electronic device.

According to one aspect of the invention, the communication channel is arranged so that said zone data are transmitted to the server without storing said images on said electronic device.

According to one aspect of the invention, the analysis step comprises consolidating the zone data with other zone data associated with one or more other electronic device(s) located in said zone.

According to one aspect of the invention, the analysis step comprises the classification of the event, the method for exchanging information further comprising:
- a step of the server producing warning data on the basis of said analysis;
- a step of the server sending said warning data to predetermined services or individuals on the basis of the classification of the event.

According to one aspect of the invention, the warning data are also based on the classification of the event and/or a location of the predetermined services or individuals.

The invention also relates to a method for processing data about an event located in a zone implemented by a server capable of exchanging information with an electronic device comprising an image acquisition device, the method for processing data comprising:
- a step of receiving zone data originating from an electronic device located in the zone, the zone data comprising images of the event and location data of said electronic device;
- a step of analysing the zone data;
- a step of generating user information on the basis of said analysis;
- a step of feeding back information, in which the server transmits said user information to the electronic device, in order to send said user information to the user.

According to one aspect of the invention, the analysis step comprises the classification of the event, the method for processing data further comprising:
- a step of the server producing warning data on the basis of said analysis;
- a step of the server sending said warning data to predetermined services or individuals based on the classification of the event.

The invention also relates to a server capable of exchanging information with an electronic device, the server comprising a computer configured to execute the steps of the method for processing data.

The invention also relates to a computer program product comprising the program instructions implementing the steps of the method for processing data, when the program instructions are executed by a computer.

The invention also relates to a system for exchanging information about an event located in a zone, comprising a server and an electronic device comprising an image acquisition device, the electronic device being configured to acquire zone data comprising images of the event acquired by the acquisition device, and location data of said electronic device, after opening a two-way communication channel between the electronic device and the server, triggered by a user located in the zone, and to transmit said zone data to the server, the server being configured to analyse said zone data in order to generate user information on the basis of said analysis, and to transmit said user information to the electronic device, the electronic device also being configured to send said user information to the user.

Further advantages and features of the invention will become apparent from reading the description and the drawings.

FIG. 1 shows a user 1 located in a zone Z.

The user 1 is holding a telephone comprising a camera in their hand.

An event E occurs in the zone Z.

An event E can be an accident or an incident such as a panicking crowd, an attack, a fire, a demonstration, an individual who is unwell, a gathering of individuals, an individual shouting or calling for help, an altercation, a natural disaster, a landslide. These examples are non-limiting.

Figure 1:
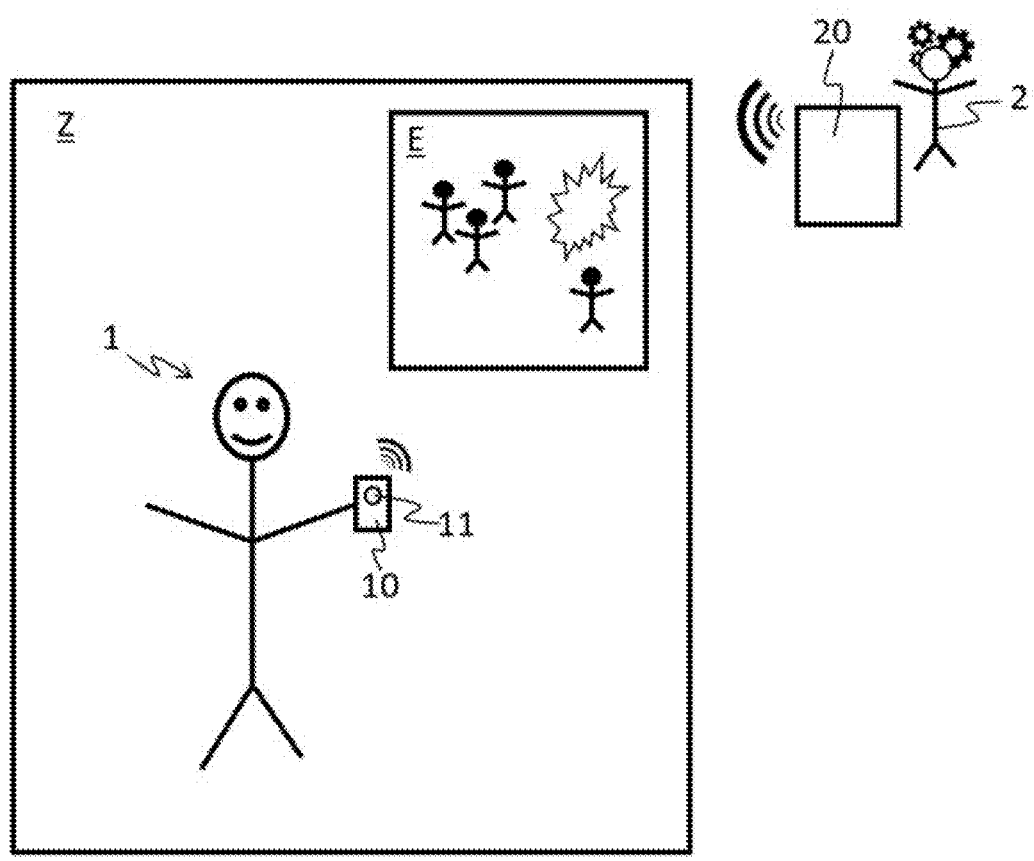
FIG. 1 shows a system for exchanging information comprising a server and an electronic device.
Figure 2:
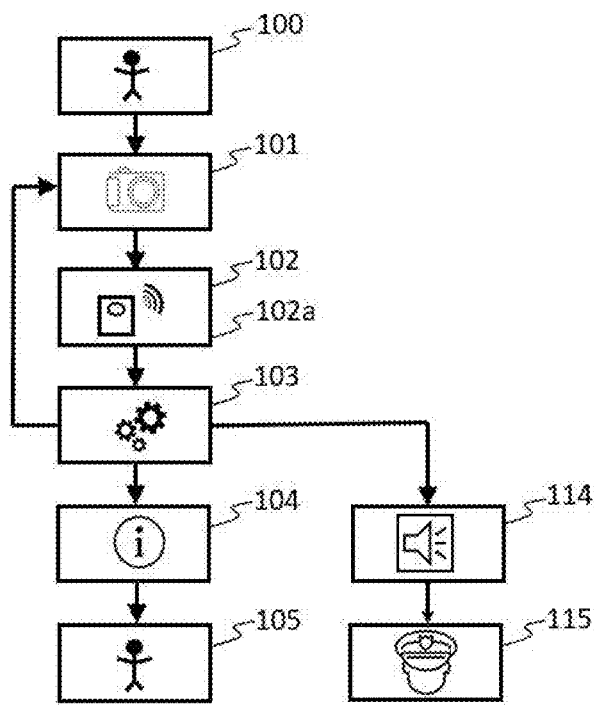
FIG. 2 shows the steps of a method for exchanging information.

FIG. 1 also shows a system for exchanging information comprising a server 20 and an electronic device 10.

The server 20 is not generally located in the zone Z, but this is possible if the event E occurs close to the site where the server 20 is located. The electronic device 10 is located in the zone Z.

The electronic device 10 comprises an image acquisition device 11.

In FIG. 1, the electronic device 10 is a telephone and the image acquisition device 11 is a camera. This is a mobile electronic device 10 in the zone Z. The user 1 holds the electronic device 10 in their hand.

Another example of a mobile electronic device 10 is an electronic watch, a computer, an electronic tablet, electronic glasses, an electronic headset. This list is non-limiting.

However, alternatively, the electronic device 10 can be fixed in the zone Z. For example, the electronic device 10 can be a terminal provided with a camera.

The server 20 and the electronic device 10 are able to communicate with each other in a two-way manner, in particular using wireless communication means, for example, using radio waves.

A professional operator 2 of the server 20 is shown in FIG. 1. A professional operator 2 is capable of analysing data stored on the server 20. The professional operator 2 is an analyst who can advantageously supplement or correct a machine analysis performed by a computer of the server 20 by a human analysis.

In this case, the server 20 comprises a computer capable of performing a machine analysis, of sending machine data resulting from the machine analysis to a professional operator 2 and of receiving processed data resulting from a human analysis of the machine data, performed by the professional operator 2.

The method for exchanging information according to the invention comprises several steps.

According to an opening step 100, a user 1 located in the zone Z triggers the opening of a two-way communication channel between the electronic device 10 and the server 20.

Opening a two-way communication channel is triggered by the user 1. After the communication channel is opened, the server 20 can send data to the electronic device 10 and the electronic device can send data to the server 20. The communication channel is two-way, which means that communication within the communication channel is two-way.

Opening the communication channel can be triggered by the electronic device 10 reading a code displayed in said zone Z, at the initiative of the user 1. For example, the user is located in the zone Z and notices that an event E is unfolding in said zone Z. A code is displayed in the zone Z, for example, a QR-code. The code is displayed, for example, on a sign, a wall, a terminal. The user 1 moves to the location where the code is displayed and scans it with their electronic device 10, in particular their telephone.

Opening the communication channel can be triggered by the user 1 activating a hyperlink sent by a communication system to the electronic device 10. For example, a communication system sends a message, in particular an SMS (Short Message Service) comprising a hyperlink, to electronic devices 10 located in the zone Z or in the vicinity of the zone Z. The user 1 clicks on the hyperlink, which will open a predetermined web page or application on the electronic device 10.

The communication system can send a message comprising the hyperlink only to subscribers to a service of the communication system. The subscribers advantageously share the position of their electronic device 10 with the communication system. This allows the communication system to send the message comprising the hyperlink to subscribers whose electronic device 10 is located in the zone Z.

Alternatively, the communication system can retrieve a list of addresses of electronic devices 10 located in the zone Z via a telephone operator and send them a message comprising the hyperlink.

The user 1, upon receipt of the message comprising the hyperlink, may or may not decide to open said hyperlink. If the user 1 does not open the hyperlink, the opening step 100 is not implemented.

Advantageously, the operating duration of the hyperlink is less than the duration of the event E. Thus, when the event E is deemed by the server 20 to have ended, the hyperlink no longer functions, which allows the influx of non-pertinent data to the server 20 to be limited, which influx is linked to the non-pertinent or improper implementation of the method for exchanging information, by non-pertinent or improper use by users of electronic devices 10.

Opening the communication channel can be triggered by the user 1 opening an application installed on the electronic device 10. The user 1 has previously installed a specific application on their electronic device 10. Upon detection of an event E in the zone Z, the user 1 opens the specific application.

In the case of a fixed electronic device, opening the communication channel can be triggered by pressing a button on the electronic device or by selecting a menu on a screen of the electronic device. Upon detection of an event E in the zone Z, the user 1 moves to the electronic device and presses the button or selects the menu.

According to an acquisition step 101, the electronic device 10 acquires zone data.

The zone data comprises:
  images of the event E acquired by the acquisition device 11; and
  location data of said electronic device 10.

In the case of a mobile electronic device 10, the user 1 moves, if necessary and if possible, to the site of the event E and directs the lens of the acquisition device 11 of the electronic device 10 towards the event E. The user 1 triggers the acquisition of images of the event E by the acquisition device 11, preferably the acquisition of video images.

In the case of a fixed electronic device 10, the user 1 moves to the electronic device 10 and directs the lens of the acquisition device 11 of the electronic device 10 towards the event E if possible. If the acquisition device 11 does not continuously acquire images, the user 1 triggers the acquisition of images.

In the case of a mobile electronic device 10, the electronic device 10 comprises a location device. The electronic device 10 is therefore capable of acquiring location data via the on-board location device.

In the case of a fixed electronic device 10, the electronic device 10 knows its geographical position, which is fixed and therefore comprises location data in a memory. The electronic device 10 can also comprise a location device, even if its location is fixed.

Optionally, but advantageously, the zone data can comprise user data selected by the user 1 from among a plurality of predetermined event contexts. For example, the user 1 is able to select predetermined event contexts from a drop-down menu. The following can be cited by way of non-limiting examples: attacks, violence, armed assault, illness, panic, demonstration, gathering of individuals, call for help, suicide, fight, landslide, flood, fire, gas leak, etc.

The user data can comprise one or more event contexts. Indeed, the user 1 can select several event contexts.

According to a transmission step 102, the electronic device 10 transmits said zone data to the server 20. The transmission step 102 comprises a step 102a of the server 20 receiving zone data originating from the electronic device 10 located in the zone Z.

The server 20 therefore receives images of the event E and location data of the electronic device 10 located in the same zone Z as the event E. The server 20 thus receives images of the event E and approximate location data of the event E. Optionally, the server 20 also receives user data that specifies the context of the event E, according to the user 1.

The electronic device 10 can request an authorization from the user 1 to send zone data to the server 20, in particular an authorization to send location data.

Advantageously, the communication channel between the electronic device 10 and the server 20 is arranged so that said zone data are transmitted to the server 20 without storing images on said electronic device 10.

Optionally, the communication channel can be arranged so as to provide the possibility of images being stored on the electronic device 10 in the event of a breakdown in the communication channel between the electronic device 10 and the server 20 or in the event of poor transmission quality of the zone data. Advantageously, storage is only possible in this case within the limit of the duration of the breakdown in the communication channel or of the transmission quality issue, and is preferably limited to a predetermined duration.

More advantageously, the stored images are encrypted so that they cannot be used by the user 1.

The advantage of this particular arrangement of the communication channel is that it prevents personal use of the images by the user 1 or the images from being broadcast over social media networks. This prevents unethical, malicious or commercial use of the images and the legal issues of image rights.

Preferably, the data conveyed through the communication channel are encrypted, in particular the images.

According to an analysis step 103, the server 20 analyses the zone data.

Advantageously, the analysis step 103 comprises a machine analysis by a computer of the server 20 and a human analysis by one or more professional operator(s) 2 of the server 20.

The analysis comprises diagnosing the images in order to check that the event E is a pertinent event. If the user implements the method of the invention in an improper and non-pertinent manner, the diagnosis detects this and ends the execution of the method by closing the communication channel between the communication device 10 and the server 20, for example.

The analysis comprises time-stamping, storing and optionally tracing the images for subsequent use by approved services, in particular for the purposes of evidence.

The analysis comprises classifying the event E.

A classification is, for example, a fire, a gas leak, an altercation, an accident with casualties, an accident without casualties.

The classification combines the event contexts in its content, but the purpose is not the same.

The classification of the event E is carried out with a view to warning or informing predetermined services or individuals, for example, with a view to intervening in the zone Z, to generating statistical data or to providing evidence.

The classification of the event E can be used to provide a warning or information for predetermined services or individuals, on the basis of said classification. For example, in the case of a fire, the predetermined services are the fire brigade. In the case of an accident with casualties, several predetermined services are pertinent: the police and the medical emergency services.

The purpose of the event contexts is to propose a list of event contexts to a user with a view to said user selecting user data, in order to improve the analysis.

Indeed, the user data can allow the analysis to be expedited. An analysis of the images is more efficient and targeted when the context of the event E is identified.

For example, if the server 20 has user data specifying a context of an armed assault, the image analysis can immediately focus on counting individuals, weapons, facial recognition of weapon bearers and an assessment of a need for medical assistance.

For example, if the server 20 has user data specifying a fire context, the analysis of the images can focus directly on a location of flames in the images in order to determine, for example, the floor where the fire is raging in a building, the characteristics of the flames in order to determine the extent of the fire, and the assessment of a danger to individuals in the zone Z.

The analysis comprises detecting individuals or objects in the images, in particular a number of individuals involved in the event E, potential casualties, weapons, vehicles.

The analysis comprises characterizing individuals in the images, in particular using biometric means, characterizing objects or noises, with a view to a comparison with a database of models for recognizing, identifying and authenticating said individuals, objects or noises. Characterizing a noise allows an explosion, an affray, a fire, a crowd panic to be suspected, for example.

The server 20 can comprise an artificial intelligence module for faster and more reliable analysis results.

Advantageously, one or more professional operator(s) 2 of the server 20 can intervene, if necessary, in a validation role, in particular at the end of the chain of automatic analysis operations of the server 20. This makes it possible to benefit both from the speed and the computing power provided by automatic analysis operations and from the quality of the human analysis provided by the intervention of professionals, in particular downstream of the automatic analysis operations, where this is most pertinent.

The server 20 is capable of receiving other zone data sent by one or more other electronic device(s) 10 located in said same zone Z. The other zone data are associated with one or more other opening(s) of a two-way communication channel between the server 20 and said other electronic devices 10 triggered by one or more other user(s) located in the zone Z.

In this case, the analysis step 103 advantageously comprises the server 20 consolidating all the zone data associated with the zone Z. The server 20 then performs the analysis on the consolidated zone data.

Consolidating the zone data allows a degree of confidence to be increased in, for example, the user data that the server 20 can compare, whereby the context of the event then can be confirmed and specified.

Consolidating images allows the analysis to be enhanced, as the server has images of the same event E from different viewpoints.

The location of the event also can be better evaluated and specified if the server 20 has the location of a plurality of electronic devices 10 in the zone Z.

The transmission step 102, and the analysis step 103 are performed at the same time. Thus, as the zone data are transmitted to the server 20, the server 20 analyses said zone data.

Advantageously, with a view to the user data being selected by the user 1, the plurality of predetermined event contexts is based on the location of the electronic device.

Indeed, on the basis of the location of the electronic device 10, some event contexts are not pertinent. Thus, for an electronic device 10 located in Paris, it is not pertinent for the user 1 to be proposed a maritime event context such as a tsunami.

Advantageously, the plurality of predetermined event contexts is based on the analysis.

Indeed, on the basis of the analysis of the first images, the server 20 can exclude some event contexts. For example, if a first analysis detects flames in the images, it is not pertinent for the user 1 to be proposed event contexts such as a flood.

As described above, the analysis is performed on the zone data or the consolidated zone data.

Advantageously, the plurality of predetermined event contexts is based on a log of events about said zone Z.

For example, if the server 20 has a log of events E about said zone Z, the server 20 can estimate the likelihood of the occurrence of a context related to the event E. For example, if altercations between individuals frequently occur in the zone Z, then it is pertinent for event contexts relating to an altercation context to be proposed to the user 1.

Advantageously, the plurality of predetermined event contexts is based on contextual data such as a time of day or year, an hour, a day, a month, a season, the weather, a pollution reading, road or rail traffic, a programme of demonstrations, a political context, etc. This list is non-limiting.

For example, some events are more likely to occur at night and it is pertinent to propose night-time event contexts to the user 1 when the event E occurs at night.

Thus, the event contexts proposed to the user 1 can be filtered, with some event contexts not being proposed to the user because they are unlikely with respect to the analysis, the location of the electronic device 10, contextual data and/or a log of events about said zone Z.

The event contexts proposed to the user 1 also or alternatively can be ranked from the most likely to the least likely on the basis of the analysis, the location of the electronic device 10, contextual data and/or a log of events about said zone Z. Thus, when the user 1 selects the event contexts, the most likely event contexts are proposed to them as a priority, for example, in the header of a drop-down menu. Selection errors are thus minimized and the selection of the user is expedited.

The user data are thus more pertinent and very quickly available to the electronic device 10.

Thus, advantageously, event contexts are proposed to the user 1 with a view to generating user data, after a first analysis by the server 20 of first zone data associated with the electronic device 10 of said user 1 or of other zone data associated with one or more other electronic device(s) 10.

It is also possible to propose that the user 1 selects event contexts from among a plurality of unfiltered and unclassified event contexts, in particular before a first analysis of the images has been conducted by the server 20. As described above, this also has an advantage. The user data can allow the analysis by the server 20 to be expedited. Indeed, an analysis of the images is more efficient and targeted when the context of the event E is identified.

User data can be sent several times during the transmission step, for example, if the server 20 needs to specify, confirm or verify the context of the event E for its analysis.

It is therefore possible for the electronic device 10 to send user data before the first analysis by the server 20 and after a first analysis by the server 20.

When the event contexts are unfiltered and unclassified, they can be proposed to the user 1 for selection with a view to generating user data, by default, without prior filtering or classification by the server 20.

When the event contexts are filtered or classified, the server 20 sends a list of filtered or classified event contexts, or filter and/or classification data, to the electronic device 10 in advance, following a first analysis of consolidated or unconsolidated zone data, so that said electronic device 10 proposes filtered and/or classified event contexts to the user 1 with a view to selecting the user data.

According to a generation step 104, the server 20 generates user information on the basis of said analysis, with said analysis being derived from a machine analysis performed by a computer of the server 20 and optionally advantageously completed, compiled, validated and/or corrected by a human analysis performed by a professional operator 2 of the server 20.

The aim is to generate useful information for the user 1 located in the zone Z, close to the location of the event E.

The user information can be recommendations on action to be taken, preferred evacuation routes, general information about the event E, such as a danger or threat level, a duration, information to be broadcast about the zone Z. These examples are non-limiting.

Advantageously, the user information is based on the location of the electronic device. Indeed, in order to inform a user 1 of an evacuation path, their position advantageously needs to be taken into account, which is substantially the same as that of the electronic device 10.

According to an information feedback step 105, the server 20 transmits said user information to the electronic device 10, in order to send said user information to the user 1.

The information can be sent by sending an SMS message to the electronic device 10, to a web page, to an application downloaded on the electronic device.

For its part, the server 20 implements the invention via a method for processing data about an event located in a zone implemented by a server capable of exchanging information with an electronic device comprising an image acquisition device, the method for processing data comprising:

- a step 102*a* of receiving zone data originating from an electronic device located in the zone, the zone data comprising images of the event and location data of said electronic device;
- the step 103 of analysing the zone data;
- the step 104 of generating user information on the basis of said analysis;
- the step 105 of feeding back information, in which the server 20 transmits said user information to the electronic device, in order to send said user information to the user.

The method for processing data is a subset of the method for exchanging information, with the steps common to both methods being the steps implemented by the server 20.

The steps of analysing 103, generating 104 and feeding back information 105 have been described within the scope of the method for exchanging information. All the embodiments, details, options and examples that have been described for the method for exchanging information are valid for the method for processing data, within the scope of their implementation by the server 20.

If it is advisable to warn predetermined services or individuals about the event E, the method for exchanging information further comprises two additional steps. These steps are also applicable to the method for processing data since they are implemented by the server 20.

According to a production step 114, the server 20 produces warning data, on the basis of said analysis and, in particular, on the basis of the classification of the event E.

The warning data comprise, for example, images selected from among the images originating from the zone data or the compiled zone data.

Based on the classification of the event, the selected images are not the same. For example, in the case of the classification of an attack, it is advisable to produce overall images of the event, images of the faces of the terrorists, weapons and potential casualties. Within the context of a fire, it is advisable to produce images of the flames and the individuals trapped by the flames.

The warning data comprise, for example, the address of the event E, the start time of the event E, the classification of the event E, the number of casualties, the number of individuals involved in the event, a level of urgency, violence, danger.

Advantageously, the warning data are based on the location of the predetermined services or individuals. Indeed, it can be advisable to send images from a certain point of view to a predetermined person, for example, a police officer intervening in the zone Z, based on the location of said predetermined person, in this case the police officer. These images will supplement and enhance the perception that the police officer has of the event E with their own eyes.

According to a sending step 115, the server 20 sends said warning data to predetermined services or individuals on the basis of the classification of the event.

For example, in the case of an event classified as a fire, the warning data are sent to the fire station or to a firefighter intervening in the zone Z.

For example, in the case of an event classified as an attack, the warning data are sent to the police station nearest to the zone Z or to a police officer intervening in the zone Z.

The warning data are sent, for example, to a server, a computer, or to mobile display devices identified as belonging to the predetermined individuals. A non-limiting list of mobile display devices comprises a laptop computer, a multimedia system on board an emergency or police vehicle, a tablet, a telephone, a connected watch, augmented reality glasses.

Advantageously, warning data are regularly sent to predetermined services and individuals as zone data are received by the server 20.

A predetermined individual also can be a user 1 of an electronic device 10 and can help to enhance the analysis of the server 20 by providing zone data. For example, a police officer wearing augmented reality glasses intervening in the zone Z can both receive warning data from the server 20 and send zone data to said server 20 with their glasses.

Advantageously, warning data are sent in encrypted form.

The production 114 and sending 115 steps can be performed at the same time as the steps of generating 104 and feeding back information 105.

Figure 3:
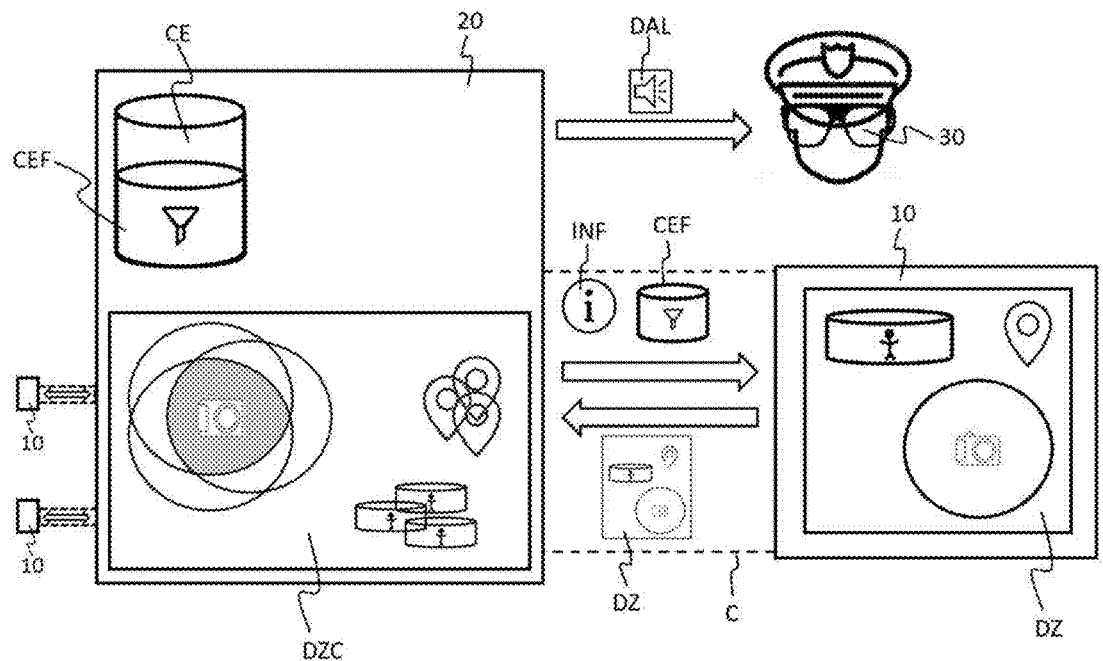
FIG. 3 shows an exchange of data streams between an electronic device and a server within a two-way communication channel.

FIG. 3 shows an example of a system comprising an electronic device 10 of a first user 1 and a server 20, but also two other electronic devices 10 of two other users.

All the electronic devices 10 are located in the same zone Z and are capable of executing the steps of the method of the invention.

In FIG. 3, only the electronic device 10 of the first user 1 is shown, but that which is applicable to the electronic device 10 of the first user 1, is applicable to the other two electronic devices 10.

The electronic device 10 of the first user 1 comprises zone data DZ.

The server 20 comprises consolidated zone data DZC originating from the zone data DZ associated with the three electronic devices 10 located in the same zone Z.

The server 20 comprises event context data CE that has been filtered and/or classified into filtered and/or classified event context data CEF following a first analysis of the consolidated zone data DZC by the server 20.

A two-way communication channel C has been opened at the initiative of the first user 1 and allows data exchanges in both directions, between the electronic device 10 and the server 20.

Several data streams within the communication channel C are shown:
- zone data DZ travelling from the electronic device 10 of the first user 1 to the server 20;
- filtered and/or classified event context data CEF travelling from the server 20 to the electronic device 10 of the first user 1;
- user information INF travelling from the server 20 to the electronic device 10 of the first user 1.

FIG. 3 also shows warning data DAL that is sent from the server 20 to connected glasses 30 of a police officer.

The invention claimed is:

1. A method for exchanging information about an event located in a zone, in a system comprising a server and an electronic device suitable for use by a user, the electronic device comprising an image acquisition device, the method for exchanging information comprising the following steps:
   a step of opening a two-way communication channel between the electronic device and the server, triggered by a user of the electronic device, the user being located in the zone;
   a step of the electronic device acquiring zone data, the zone data comprising images of the event acquired by the acquisition device and location data of said electronic device;
   a transmission step, wherein the electronic device transmits said zone data to the server;
   an analysis step of the server analysing the zone data;
   a step of the server generating user information on the basis of said analysis;
   a step of feeding back information, wherein the server transmits said user information to the electronic device, in order to send said user information to the user,
   wherein the step of opening the two-way communication channel includes a user action selected from a plurality of actions that includes at least the electronic device reading a code displayed on a physical structure in said zone at the initiative of the user.

2. The method for exchanging information according to claim 1, the analysis step comprising a machine analysis by a computer of the server and a human analysis by a professional operator of the server.

3. The method for exchanging information according to claim 1, the user information being based on the location of said electronic device.

4. The method for exchanging information according to claim 1, the zone data further comprising user data selected by the user from among a plurality of predetermined event contexts.

5. The method for exchanging information according to claim 4, the plurality of predetermined event contexts being based on the analysis and/or a log of events about said zone.

6. The method for exchanging information according to claim 1, wherein the plurality of actions further includes the user activating a hyperlink sent by a communication system to the electronic device, and the user opening an application installed on the electronic device.

7. The method for exchanging information according to claim 1, the communication channel being arranged so that said zone data are transmitted to the server without storing said images on said electronic device.

8. The method for exchanging information according to claim 1, the analysis step comprising consolidating the zone data with other zone data associated with one or more other electronic device(s) located in said zone.

9. The method for exchanging information according to claim 1, the analysis step comprising the classification of the event, the method for exchanging information further comprising:
   a step of the server producing warning data on the basis of said analysis;
   a step of the server sending said warning data to predetermined services or individuals on the basis of the classification of the event.

10. The method for exchanging information according to claim 9, the warning data also being based on the classification of the event and/or a location of the predetermined services or individuals.

11. A method for processing data about an event located in a zone implemented by a server capable of exchanging information with an electronic device comprising an image acquisition device, the method for processing data comprising:
   a step of receiving zone data originating from an electronic device located in the zone, the zone data comprising images of the event and location data of said electronic device, after opening a two-way communication channel between the electronic device and the server, triggered by a user located in the zone;
   a step of analysing the zone data;
   a step of generating user information on the basis of said analysis;
   a step of feeding back information, wherein the server transmits said user information to the electronic device, in order to send said user information to the user,
   wherein the opening of the two-way communication channel includes a user action selected from a plurality of actions that includes at least the electronic device reading a code displayed on a physical structure in said zone at the initiative of the user.

12. A server capable of exchanging information with an electronic device, comprising a computer configured to execute the steps of the method for processing data according to claim 11.

13. A non-transitory computer-readable medium that stores a computer program comprising program instructions implementing the steps of the method for processing data according to claim 11, when the program instructions are executed by a computer.

14. A system for exchanging information about an event located in a zone, comprising a server and an electronic device comprising an image acquisition device,
   the electronic device being configured to acquire zone data comprising images of the event acquired by the acquisition device, and location data of said electronic device, after opening a two-way communication channel between the electronic device and the server, triggered by a user located in the zone,
   and to transmit said zone data to the server,
   the server being configured to analyse said zone data in order to generate user information on the basis of said analysis,
   and to transmit said user information to the electronic device, the electronic device also being configured to send said user information to the user,
   wherein the electronic device is configured to trigger opening of the two-way communication channel based on a user action selected from a plurality of actions that includes at least the electronic device reading a code displayed on a physical structure in said zone at the initiative of the user.

* * * * *